US009708051B2

(12) United States Patent
Voss et al.

(10) Patent No.: US 9,708,051 B2
(45) Date of Patent: Jul. 18, 2017

(54) AIRCRAFT INTERIOR COMPONENT SYSTEM AND METHOD FOR MOUNTING AN INTERIOR COMPONENT SYSTEM IN AN AIRCRAFT (71) Applicant: AIRBUS OPERATIONS GMBH, Hamburg (DE)

(72) Inventors: Jens Voss, Harsefeld (DE); Patrique Doemeland, Hamburg (DE); Markus Horst, Oldesloe (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 828 days.

(21) Appl. No.: 13/954,734

(22) Filed: Jul. 30, 2013

(65) Prior Publication Data
US 2013/0313367 A1    Nov. 28, 2013

Related U.S. Application Data (63) Continuation of application No. PCT/EP2012/000421, filed on Jan. 31, 2012.

(30) Foreign Application Priority Data

Jan. 31, 2011    (DE) .......................... 10 2011 009 815

(51) Int. Cl.
*B64C 1/12*    (2006.01)
*B64C 1/06*    (2006.01)
(Continued)

(52) U.S. Cl.
CPC ................ *B64C 1/12* (2013.01); *B64C 1/066* (2013.01); *B64F 5/10* (2017.01); *B64D 2011/0046* (2013.01); *Y10T 29/49947* (2015.01)

(58) Field of Classification Search
CPC .. B64C 1/06; B64C 1/066; B64C 1/12; B64D 11/00; B64D 2011/0046; B64F 5/0009; Y10T 29/49947

See application file for complete search history.

(56) References Cited

U.S. PATENT DOCUMENTS 2,070,839 A * 2/1937 Place ..................... B60R 3/002
                                                    24/293
2,912,724 A * 11/1959 Wilkes .................... B64C 1/066
                                                    181/207
(Continued)

FOREIGN PATENT DOCUMENTS

DE    10 2009 023 391    12/2010
DE    10 2009 023 393    12/2010
(Continued)

OTHER PUBLICATIONS

International Search Report dated Sep. 10, 2012.

*Primary Examiner* — Justin Rephann
(74) *Attorney, Agent, or Firm* — Dickinson Wright (57) ABSTRACT An aircraft interior component system includes an aircraft interior component, a first structure holder fastened to an element of the aircraft structure, and a first component holder fastened to the aircraft interior component. The first component holder is fastened to the aircraft interior component in a first region thereof which faces an aircraft cabin ceiling when the aircraft interior component is mounted in an aircraft. The first structure holder and the first component holder attach the aircraft interior component in a suspended manner to the element, such that a mounting gap is present, at least in a second region of the aircraft interior component facing an aircraft cabin floor when the aircraft interior component is mounted in an aircraft, between a rear side of (Continued)

the aircraft interior component and an aircraft component opposite the rear side of the aircraft interior component.

13 Claims, 4 Drawing Sheets

Related U.S. Application Data (60) Provisional application No. 61/437,711, filed on Jan. 31, 2011.

(51) Int. Cl.
*B64F 5/10* (2017.01)
*B64D 11/00* (2006.01)

(56) References Cited

U.S. PATENT DOCUMENTS

| | | | | |
|---|---|---|---|---|
| 2,925,050 | A * | 2/1960 | Candlin, Jr. | B61D 17/08 105/397 |
| 4,375,876 | A * | 3/1983 | Stewart | B64C 1/1438 160/201 |
| 4,541,595 | A * | 9/1985 | Fiala | B64C 1/1492 244/129.3 |
| 4,739,955 | A * | 4/1988 | Aquino | B64C 1/403 160/88 |
| 4,799,631 | A * | 1/1989 | Humphries | B64D 11/00 105/337 |
| 5,044,578 | A * | 9/1991 | White | B64C 1/066 244/117 R |
| 5,201,831 | A | 4/1993 | Higgins | |
| 6,120,070 | A | 9/2000 | Myers | |
| 6,612,217 | B1 * | 9/2003 | Shockey | B32B 5/02 244/121 |
| 7,118,069 | B2 * | 10/2006 | Novak | B64C 1/066 244/119 |
| 2004/0065777 | A1 * | 4/2004 | Hopkins | B64C 1/1492 244/129.3 |
| 2005/0005544 | A1 * | 1/2005 | Borowiecki | B64C 1/40 52/204.5 |
| 2005/0044712 | A1 * | 3/2005 | Gideon | B60R 13/02 29/897.32 |
| 2005/0236523 | A1 * | 10/2005 | Schwartz | B64C 1/066 244/119 |
| 2006/0102786 | A1 * | 5/2006 | Granzeier | B60R 13/02 244/119 |
| 2006/0118676 | A1 | 6/2006 | Novak | |
| 2009/0230244 | A1 * | 9/2009 | Kofinger | B64C 1/066 244/118.5 |
| 2010/0240290 | A1 * | 9/2010 | Markwart | B64D 13/00 454/71 |
| 2010/0301167 | A1 | 12/2010 | Humfeldt | |
| 2010/0301537 | A1 | 12/2010 | Humfeldt | |
| 2012/0012218 | A1 * | 1/2012 | Sabadie | B64C 1/066 138/106 |
| 2012/0131779 | A1 | 5/2012 | Umlauft | |
| 2012/0137487 | A1 | 6/2012 | Umlauft | |
| 2012/0234979 | A1 * | 9/2012 | Smith | B64C 1/40 244/158.1 |
| 2013/0200213 | A1 * | 8/2013 | Umlauft | B64C 1/066 244/129.1 |
| 2013/0320140 | A1 * | 12/2013 | Cheung | B64C 1/066 244/119 |

FOREIGN PATENT DOCUMENTS

| | | |
|---|---|---|
| DE | 10 2009 023 400 | 12/2010 |
| DE | 10 2009 023 401 | 12/2010 |
| EP | 0 262 704 | 4/1988 |
| EP | 2 354 570 | 8/2011 |

* cited by examiner

AIRCRAFT INTERIOR COMPONENT SYSTEM AND METHOD FOR MOUNTING AN INTERIOR COMPONENT SYSTEM IN AN AIRCRAFT

CROSS REFERENCE TO RELATED APPLICATIONS

This application is a bypass continuation of PCT/EP2012/000421 filed Jan. 31, 2012 which is entitled to and claims benefit of German Application No. DE 10 2011 009 815.1 filed Jan. 31, 2011, and U.S. Provisional Application No. 61/437,711, filed Jan. 31, 2011, the disclosures of each of which, including the specification, claims, drawings and abstract, are incorporated herein by reference in their entirety.

FIELD

The invention relates to an aircraft interior component system and to a method for mounting an interior component system in an aircraft.

BACKGROUND

On the final mounting of interior components in an aircraft, it is customary at present to fasten components, such as, for example, side covering panels, dada panels, light strips, etc., individually to the aircraft structure and in so doing to connect component-side sections of relevant supply lines, such as, for example, electric lines, air-conducting lines of an aircraft air-conditioning system or pipelines serving for water supply in an aircraft cabin, to corresponding aircraft-side sections of the supply lines. Since each component has to be positioned as accurately as possible before it is fastened to the aircraft structure, the final mounting of interior components in an aircraft cabin is very time-consuming. Furthermore, owing to the limited mounting space in the aircraft cabin, it is as a rule comparatively difficult in particular to connect the supply lines.

It is known from DE 10 2009 023 391 A1 to preassemble and test interior components intended for mounting in an aircraft cabin as extensively as possible outside the aircraft. In particular, large modules which may comprise a plurality of overhead luggage compartments, a plurality of side covering panels and other interior components, such as, for example, electric lines, air-conducting lines of an aircraft air-conditioning system or pipelines serving for water supply in the aircraft cabin, personal service units and personal service channels, are to be preassembled and tested outside the aircraft, optionally with the aid of a suitable assembly apparatus, described in DE 10 2009 023 391 A1. Subsequently, the large modules are to be transported, for example by means of a transporting apparatus described in DE 10 2009 023 393 A1, into a final mounting position in an aircraft fuselage element. To fasten the large modules to the transporting apparatus and the aircraft structure, holders described in DE 10 2009 023 400 A1 and DE 10 2009 023 401 A1 may be used. However, a plurality of large modules comprising interior components may possibly be difficult to handle.

SUMMARY

The object on which the invention is based is to provide an aircraft interior component system which can be mounted quickly and simply in an aircraft.

Furthermore, the invention is directed at the object of specifying a method for quick and simple mounting of an interior component system in an aircraft.

This object is achieved by an aircraft interior component system having features of attached claims and a method for mounting an interior component system in an aircraft having features of attached claims.

The aircraft interior component system according to the invention comprises an aircraft interior component which can be designed in the form of an individual component, for example a side covering panel. Alternatively to this, however, the aircraft interior component of the aircraft interior component system according to the invention can also be designed in the form of an aircraft interior component module which can be composed of a plurality of individual modules, for example a side covering panel, a dado panel and/or further components. Furthermore, the aircraft interior component system according to the invention comprises a first structure holder, which is fastened to an element of the aircraft structure. The element of the aircraft structure can be, for example, a frame or a stringer, but also another component fixed to the structure. Furthermore, the aircraft interior component system comprises a first component holder, which is fastened to the aircraft interior component and is complementary to the first structure holder.

The first component holder is fastened to the aircraft interior component in a first region of the aircraft interior component which faces an aircraft cabin ceiling when the aircraft interior component is mounted in an aircraft. In other words, the first region of the aircraft interior component, in which the first component holder is fastened to the aircraft interior component, forms an upper region of the aircraft interior component when the aircraft interior component is mounted in an aircraft. The first structure holder and the first component holder are designed to attach the aircraft interior component in a suspended manner to the element of the aircraft structure. For example, a holder arrangement as described in EP 2 354 570 A1 can be employed as the first structure holder and the first component holder. If desired or required, the aircraft interior component system according to the invention can also comprise a plurality of first structure holders and/or a plurality of first component holders. All that is essential is that through the position of the first structure holder and of the first component holder the position of the aircraft interior component in the aircraft cabin is substantially fixed in the vertical direction, i.e. in the z-direction, it being possible however, if desired, for the first structure holder and/or the first component holder also to enable a certain tolerance compensation in the positioning of the aircraft interior component in the aircraft cabin.

The aircraft interior component is configured such that, when the aircraft interior component, brought about by the cooperation of the first structure holder with the first component holder, is attached in a suspended manner to the element of the aircraft structure, a mounting gap is present, at least in a second region of the aircraft interior component which faces an aircraft cabin floor when the aircraft interior component is mounted in an aircraft, between a rear side of the aircraft interior component and an aircraft component opposite the rear side of the aircraft interior component. Here, "rear side of the aircraft interior component" is understood to mean a side, i.e. a surface of the aircraft interior component, which faces away from an interior space of the aircraft cabin when the aircraft interior component is mounted in an aircraft. The mounting gap thus extends between a rear-side surface, at least of the second region of the aircraft interior component which forms a lower region of the aircraft interior component when the aircraft interior component is mounted in an aircraft, and the aircraft component opposite the rear side of the aircraft interior component. The mounting gap can, however, also extend along the entire rear side of the aircraft interior component.

The term "mounting gap" here refers to a three-dimensional free space which is bounded by the rear side of the aircraft interior component and the aircraft component opposite the aircraft interior component when the aircraft interior component is mounted in an aircraft. The aircraft component opposite the rear side of the aircraft interior component can be an element of the aircraft structure, for example a frame, but also another aircraft component, for example an insulation component or any desired functional component of the aircraft. The mounting gap arranged between the rear side of the aircraft interior component and the aircraft component opposite the rear side of the aircraft interior component is preferably dimensioned such that a fitter can reach into the mounting gap.

In order to ensure that, when the aircraft interior component is attached in a suspended manner to the element of the aircraft structure, the mounting gap between the rear side of the aircraft interior component and the aircraft component facing the rear side remains free, the aircraft interior component preferably has an appropriate shape adapted to the shape and the position of the aircraft component opposite the rear side of the aircraft interior component. Furthermore, the centre of gravity of the aircraft interior component is preferably positioned such that, on the suspended fastening of the aircraft interior component to the element of the aircraft structure, the desired mounting gap is formed between the rear side of the aircraft interior component and the aircraft component opposite the rear side of the aircraft interior component.

The aircraft interior component system according to the invention can be mounted quickly and simply in an aircraft, since it is merely necessary firstly to fasten the first structure holder to the element of the aircraft structure and then in a single mounting step to attach the aircraft interior component in a suspended manner to the element of the aircraft structure by engagement of the first component holder with the first structure holder. The mounting gap, which is open between the rear side of the aircraft interior component and the aircraft component opposite the rear side of the aircraft interior component, results in the rear side of the aircraft interior component and the rear side of the aircraft component opposite the aircraft interior component remaining accessible even after the suspended fastening of the aircraft interior component to the element of the aircraft structure, thereby simplifying further mounting work.

Preferably, the aircraft interior component of the aircraft interior component system according to the invention is configured such that the mounting gap, which is present between the rear side of the aircraft interior component and the aircraft component opposite the rear side of the aircraft interior component when the aircraft interior component is attached in a suspended manner to the element of the aircraft structure, tapers in the direction of the first region of the aircraft interior component. This, on the one hand, enables a secure fastening of the aircraft interior component to the element of the aircraft structure and, on the other hand, prevents the aircraft interior component from occupying too much mounting space in the aircraft cabin in its state when attached in a suspended manner to the element of the aircraft structure.

In the region of a lower edge of the aircraft interior component which faces an aircraft cabin floor when the aircraft interior component is mounted in an aircraft, the distance between the rear side of the aircraft interior component and the aircraft component opposite the rear side of the aircraft interior component when the aircraft interior component is attached in a suspended manner to the element of the aircraft structure is preferably between approx. 10 cm and approx. 30 cm, particularly preferably between approx. 15 cm and approx. 25 cm. A mounting gap so dimensioned enables a fitter comfortably to reach into the mounting gap bounded by the rear side of the aircraft interior component and the aircraft component opposite the rear side of the aircraft interior component.

The aircraft interior component of the aircraft interior component system according to the invention preferably further comprises at least one supply line section which is connected to a first connecting device preferably arranged in the second region of the aircraft interior component. The supply line section assigned to the aircraft interior component can be a section of an electric line, a section of a water-conducting line or a section of an air-conducting line. The first connecting device is preferably designed to cooperate with a second connecting device complementary to the first connecting device, in order to connect the supply line section of the aircraft interior component to a corresponding aircraft-side supply line section. In such a configuration of the aircraft interior component, the mounting gap present between the rear side of the aircraft interior component and the aircraft component opposite the rear side of the aircraft interior component can be utilised to connect the first connecting device simply and conveniently to the second connecting device and thus connect the supply line section assigned to the aircraft interior component to the corresponding aircraft-side supply line section.

In a particularly preferred embodiment of the aircraft interior component system according to the invention, the aircraft interior component comprises a plurality of supply line sections which are each connected to a first connecting device preferably arranged in the second region of the aircraft interior component. The supply line sections assigned to the aircraft interior component can be sections of electric lines, sections of air-conducting lines or sections of water-conducting lines. Depending on the configuration of the supply line sections, the first connecting device can be configured in the form of a multi-system connecting device which can be connected in parallel to electric line sections, water-conducting line sections and/or air-conducting line sections. The first connecting device is preferably designed to cooperate with a second connecting device complementary to the first connecting device, in order to connect the supply line section of the aircraft interior component to corresponding aircraft-side supply line sections. In such a configuration of the aircraft interior component system according to the invention, a plurality of supply line sections assigned to the aircraft interior component can be connected in a single step, by simple connection of the first connecting device to the second connecting device, to corresponding aircraft-side supply line sections.

The first structure holder and the first component holder can be designed to attach the aircraft interior component to the element of the aircraft structure so as to be pivotable over a predetermined angular range about a pivot axis. The pivot axis can be an imaginary axis which extends, in the state of the aircraft interior component when mounted in an aircraft, in the first region of the aircraft interior component substantially parallel to a longitudinal axis of an aircraft cabin, i.e. in the x-direction. Through a pivoting of the aircraft interior component about the pivot axis the mounting gap present between the rear side of the aircraft interior component and the aircraft component opposite the rear side of the aircraft interior component can be increased or reduced. The mounting of the aircraft interior component system in an aircraft can be made particularly flexible, since the dimensions of the mounting gap can be adapted according to requirements.

The aircraft interior component system according to the invention preferably further comprises a second structure holder, which is fastened to an element of the aircraft structure. The second structure holder can be fastened to the same element of the aircraft structure as the first structure holder. Alternatively to this, however, the second structure holder can also be fastened to another element of the aircraft structure or a different component fixed to the structure than the first structure holder. Furthermore, the aircraft interior component system can comprise a second component holder, which is fastened to the aircraft interior component and is complementary to the second structure holder. The second component holder is preferably fastened to the aircraft interior component in the second region of the aircraft interior component which faces an aircraft cabin floor when the aircraft interior component is mounted in an aircraft. In other words, the second structure holder is preferably attached in the region of the aircraft interior component whose rear side bounds the mounting gap together with the aircraft component opposite the rear side of the aircraft interior component when the aircraft interior component is attached in a suspended manner to the element of the aircraft structure through the cooperation of the first structure holder with the first component holder.

The second structure holder and the second component holder are preferably designed to attach the aircraft interior component to the element of the aircraft structure in such a manner that the mounting gap between the rear side of the aircraft interior component and the aircraft component opposite the rear side of the aircraft interior component is closed. Through the cooperation of the second structure holder with the second component holder, the aircraft interior component is thus also fastened in its second region securely and without a gap. For example, a holder arrangement as described in WO 2009/080641 A1 can be employed as the second structure holder and the second component holder.

Preferably, however, the second component holder is not connected to the second structure holder until all mounting work to be carried out in the region of the mounting gap is completed. Furthermore, when carrying out maintenance work, it is possible to uncouple the second structure holder and the second component holder from one another again and thus "open" the mounting gap again. Maintenance work can then be carried out in the region of the rear side of the aircraft interior component and the aircraft component opposite the rear side of the aircraft interior component via the mounting gap, without the need to detach the aircraft interior component completely from the aircraft structure for this purpose.

The aircraft interior component system according to the invention can further comprise a third structure holder, which is fastened to an element of the aircraft structure. The third structure holder can be fastened to the same element of the aircraft structure as the first and/or the second structure holder. Alternatively to this, however, it is also possible to fasten the third structure holder to another element of the aircraft structure or another component fixed to the structure. Furthermore, the aircraft interior component system can comprise a third component holder, which is fastened to the aircraft interior component and is complementary to the third structure holder. The third component holder is preferably fastened to the aircraft interior component in a third region of the aircraft interior component lying between the first and the second region of the aircraft interior component. The third structure holder and the third component holder are preferably designed to attach the aircraft interior component in its third, central region, without a gap and thus securely, to the element of the aircraft structure. For example, the holder arrangement as described in WO 2009/080641 A1 can be employed as the third structure holder and the third component holder.

Preferably, the first structure holder and the first component holder and/or the second structure holder and the second component holder and/or the third structure holder and the third component holder can be connected to one another without tools. This enables a particularly simple mounting (click and snap) of the aircraft interior component system according to the invention in an aircraft.

A method for mounting an interior component system in an aircraft according to the invention comprises providing an aircraft interior component, which can be designed as an individual component or in the form of an interior component module. A first structure holder is fastened to an element of the aircraft structure. A first component holder, complementary to the first structure holder, is fastened to the aircraft interior component, the first component holder being fastened to the aircraft interior component in a first region of the aircraft interior component which faces an aircraft cabin ceiling when the aircraft interior component is mounted in an aircraft, i.e. forms an upper region of the aircraft interior component.

The first structure holder and the first component holder are connected to one another in such a manner that the aircraft interior component is attached in a suspended manner to the element of the aircraft structure. The aircraft interior component is configured such that, when the aircraft interior component, brought about by the cooperation of the first structure holder with the first component holder, is attached in a suspended manner to the element of the aircraft structure, a mounting gap is present, at least in a second region of the aircraft interior component which faces an aircraft cabin floor when the aircraft interior component is mounted in an aircraft, between a rear side of the aircraft interior component and an aircraft component opposite the rear side of the aircraft interior component.

In a preferred embodiment of the method according to the invention, at least one supply line section of the aircraft interior component, which is connected to a first connecting device preferably arranged in the second region of the aircraft interior component, is connected, by connecting the first connecting device to a second connecting device complementary to the first connecting device, to a corresponding aircraft-side supply line section.

Furthermore, in the method according to the invention, a plurality of supply line sections of the aircraft interior component, which are each connected to a first connecting device preferably arranged in the second region of the aircraft interior component, are connected, by connecting the first connecting device to a second connecting device complementary to the first connecting device, to corresponding aircraft-side supply line sections.

The aircraft interior component can be pivoted relative to the element of the aircraft structure over a predetermined angular range about a pivot axis, in order to increase or reduce the mounting gap present between the rear side of the aircraft interior component and the aircraft component opposite the rear side of the aircraft interior component.

The method according to the invention can further comprise fastening a second structure holder to an element of the aircraft structure. Furthermore, a second component holder, complementary to the second structure holder, can be fastened to the aircraft interior component, the second component holder preferably being fastened to the aircraft interior component in the second region of the aircraft interior component which faces an aircraft cabin floor when the aircraft interior component is mounted in an aircraft. The second structure holder and the second component holder can be connected to one another in such a manner that the mounting gap between the rear side of the aircraft interior component and the aircraft component opposite the rear side of the aircraft interior component is closed.

Furthermore, a third structure holder can be fastened to an element of the aircraft structure. A third component holder, complementary to the third structure holder, can be fastened to the aircraft interior component, the third component holder being able to be fastened to the aircraft interior component in a third region of the aircraft interior component lying between the first and the second region of the aircraft interior component. The third structure holder and the third component holder can be connected to one another in such a manner that the aircraft interior component is attached in its third region without a gap to the element of the aircraft structure.

The first structure holder and the first component holder and/or the second structure holder and the second component holder and/or the third structure holder and the third component holder are preferably connected to one another without tools.

BRIEF DESCRIPTION OF DRAWINGS

A preferred embodiment of the invention will now be explained in more detail with reference to the appended schematic drawings, of which

DETAILED DESCRIPTION

An aircraft interior component system 10 illustrated in FIGS. 1 to 4 comprises an aircraft interior component 12 which is designed in the form of a module and composed of a side covering panel 14, a decompression unit 20 comprising a dado panel 16 and a decompression grille 18, two window trim mouldings 22 and a lighting cover 24. The aircraft interior component module 12 is intended for arrangement in the side wall region of an aircraft cabin. The aircraft interior component module 12 is fastened to elements 26 of the aircraft structure which are designed in the form of frames.

To fasten the aircraft interior component module 12 to the aircraft structure, the aircraft interior component system 10 comprises two first structure holders 27 which are each fastened to a frame of the aircraft structure. Furthermore, two first component holders 30 are fastened in a first region 28 of the aircraft interior component module 12 which faces an aircraft cabin ceiling when the aircraft interior component module 12 is mounted in an aircraft and consequently forms an upper region of the aircraft interior component module 12. Each first component holder 30 is intended for cooperating with a corresponding first structure holder 27, in order to attach the aircraft interior component module 12 in a suspended manner to the frames of the aircraft structure.

Figure 1:
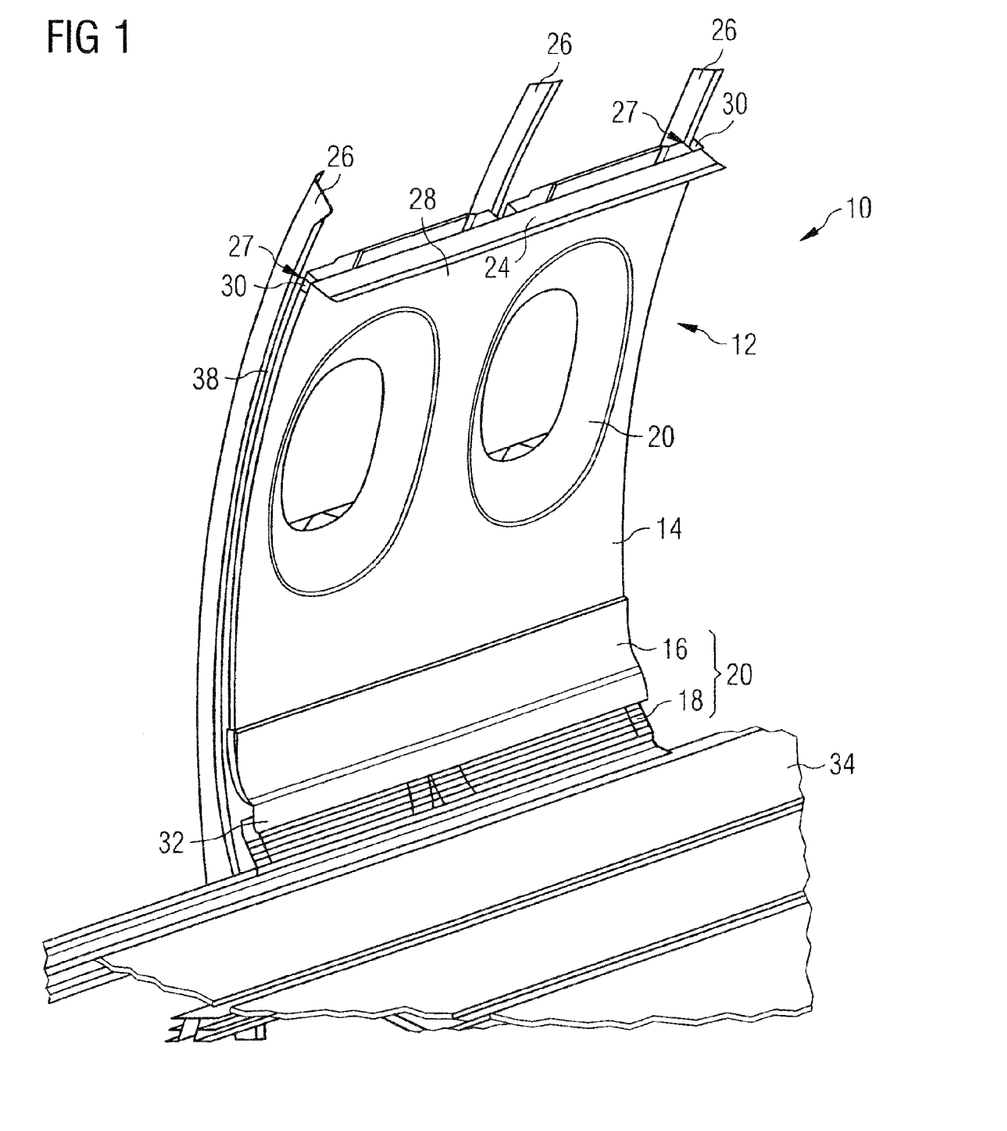
FIG. 1 shows a three-dimensional view of an aircraft interior component system.
Figure 4:
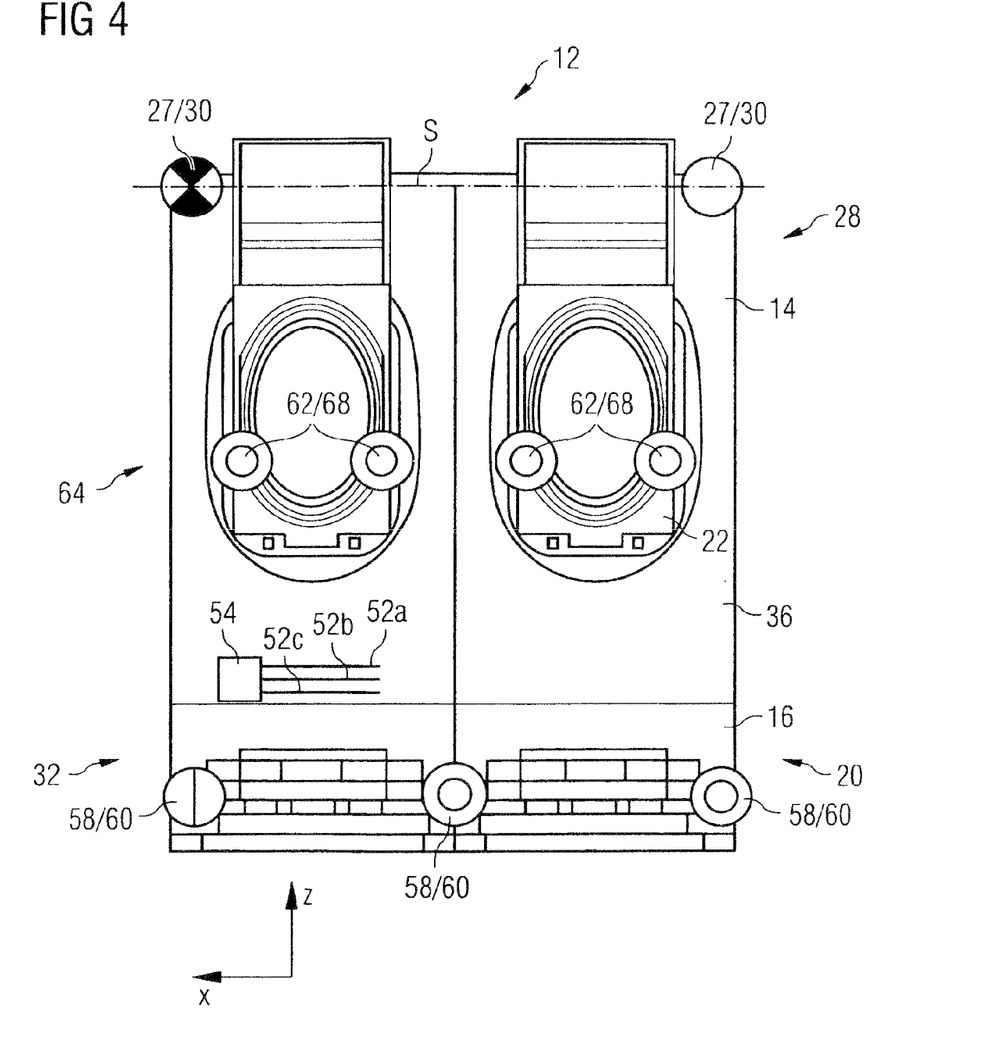
FIG. 4 shows an illustration of an aircraft interior component module of the aircraft interior component system according to FIG. 1, in which the positions of component holders for fastening the aircraft interior component module to an element of the aircraft structure are shown.

Through the positioning of the first structure holders 27 on the frames of the aircraft structure and the positioning of the first component holders 30 in the first region 28 of the aircraft interior component module 12, the position of the aircraft interior component module 12 in the aircraft cabin is fixed in the vertical direction, i.e. in the z-direction. In the embodiment illustrated here, the positions of the first structure holder 27 arranged on the left in FIGS. 1 and 4 and of the first component holder 30 arranged on the left in FIGS. 1 and 4 are fixed. By contrast, the first structure holder 27 arranged on the right in FIGS. 1 and 4 enables, in cooperation with the first component holder 30 assigned to it, a slight variation of the position of the aircraft interior component module 12 along a longitudinal axis of the aircraft cabin, i.e. in the x-direction. This enables compensation for component and mounting tolerances.

Figure 2:
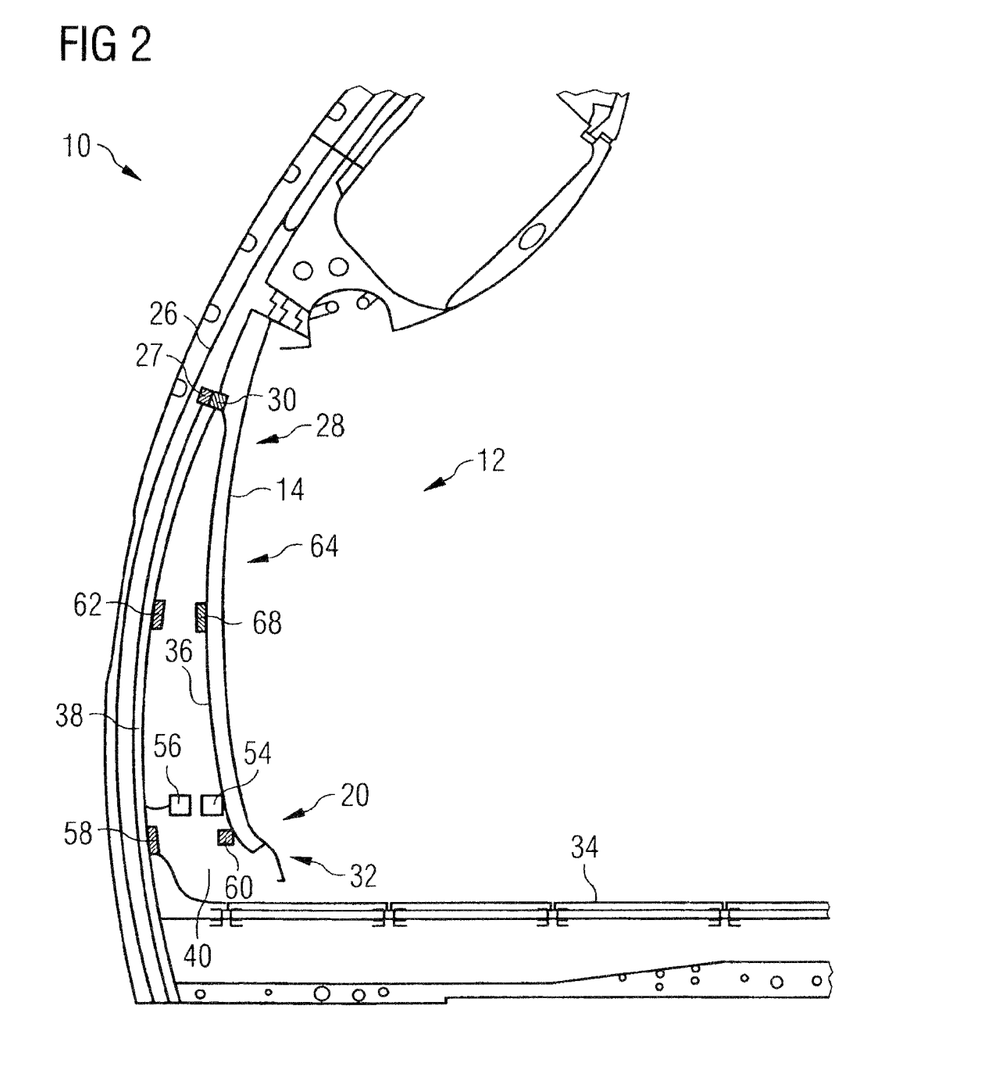
FIG. 2 shows a cross-sectional view of the aircraft interior component system according to FIG. 1 in a state in which an aircraft interior component module is fastened in a suspended manner to an element of the aircraft structure with formation of a mounting gap.

The aircraft interior component module 12 is shaped, i.e. curved and designed with respect to the location of its centre of gravity, in such a manner that, when the aircraft interior component module 12, brought about by the cooperation of the first structure holders 27 with the first component holders 30, is attached in a suspended manner to the frames of the aircraft structure, a mounting gap 40 is present, in a second region 32 of the aircraft interior component module 12 which faces an aircraft cabin floor 34 when the aircraft interior component module 12 is mounted in an aircraft, between a rear side 36 of the aircraft interior component module 12 and an aircraft interior component 38 opposite the rear side 36 of the aircraft interior component module 12 (see FIG. 2).

The mounting gap 40 tapers in the direction of the first region 28 of the aircraft interior component module 12, but is dimensioned in the second region 32 of the aircraft interior component module 12 such that a fitter can reach into the mounting gap 40 without problems. Via the mounting gap 40, the rear side 36 of the aircraft interior component module 12 and the aircraft component 38 remain accessible even after the aircraft interior component module 12 has been fastened to the frames of the aircraft structure by means of the first structure holders 27 and the first component holders 30, thereby simplifying further mounting work and maintenance work. In the region of a lower edge of the aircraft interior component module 12 which faces the aircraft cabin floor 34 when the aircraft interior component module 12 is mounted in an aircraft, the distance between the rear side 36 of the aircraft interior component module 12 and the aircraft component 38 opposite the rear side 36 of the aircraft interior component module 12 is approx. 20 cm.

The first structure holder 27 and the first component holder 30 can be formed, for example, by a holder system described in EP 2 354 570 A1. In the embodiment shown in the figures, the first structure holder 27 and the first component holder 30 are in any case configured such that the aircraft interior component module 12 can be attached to the frames of the aircraft structure so as to be pivotable over an angular range of approx. 10° about a pivot axis 50. The pivot axis 50 is formed by an imaginary axis which extends in the first region 28 of the aircraft interior component module 12 substantially parallel to the longitudinal axis of the aircraft cabin, i.e. in the x-direction. Through a pivoting of the aircraft interior component module 12 about the pivot axis 50, the mounting gap 40 can be increased or reduced.

Figure 3:
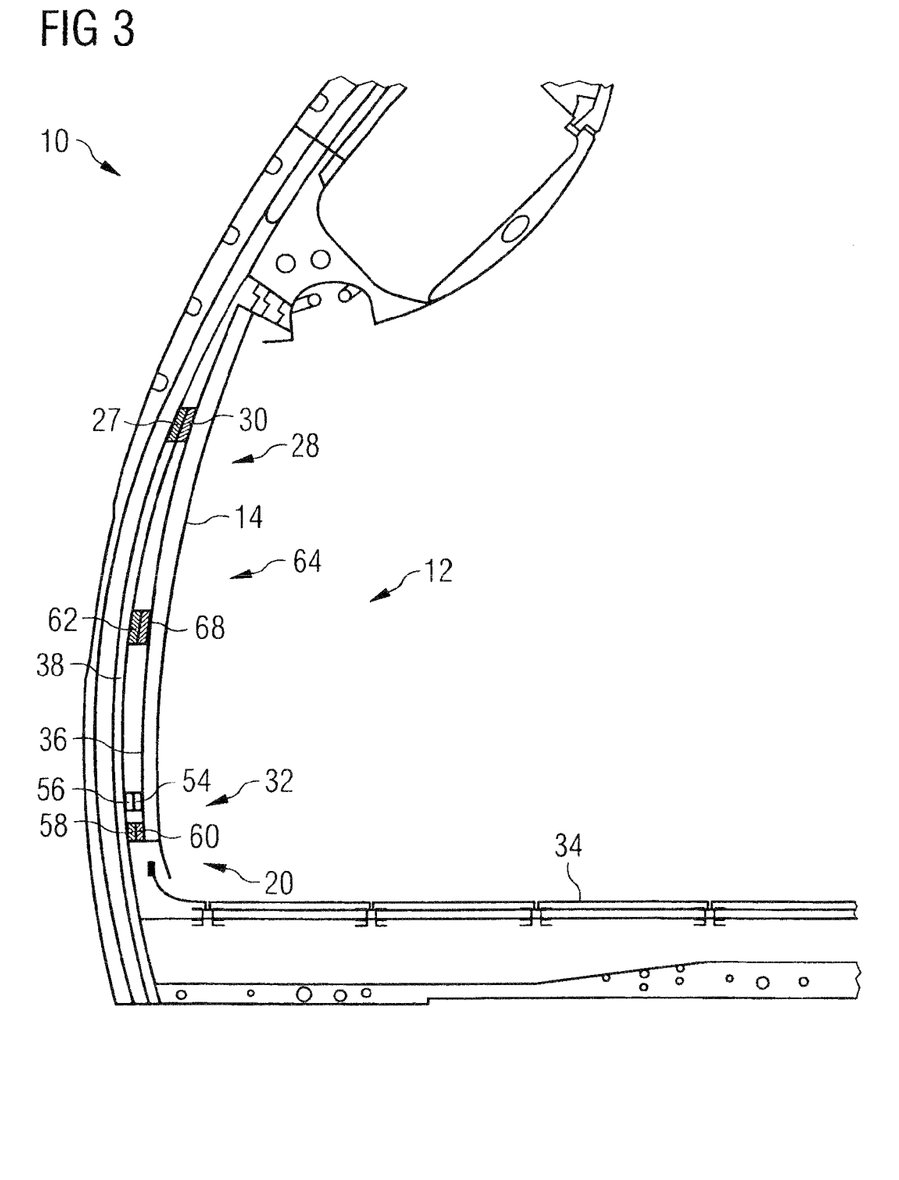
FIG. 3 shows a cross-sectional view of the aircraft interior component system according to FIG. 1 in a state in which the aircraft interior component module is connected to an element of the aircraft structure without a mounting gap.

As can best be seen in FIG. 4, the aircraft interior component module 12 further comprises a plurality of supply line sections 52a-c which are each connected to a first connecting device 54 arranged in the second region 32 of the aircraft interior component 12. The supply line sections 52a-c are designed as electric lines. As can be seen in FIGS. 2 and 3, the first connecting device 54 can be connected to a connecting device 56 complementary to the first connecting device 54, in order to connect the supply line sections 52a-c of the aircraft interior component module 12 to corresponding aircraft-side supply line sections. To connect the first connecting device 54 to the second connecting device 56, a fitter can comfortably reach into the mounting gap 40.

The aircraft interior component system 10 further comprises three second structure holders 58 which are each fastened to elements 26 of the aircraft structure formed by the frames of the aircraft structure. Furthermore, the aircraft interior component system 10 comprises three second component holders 60 which are complementary to the second structure holders 58 and are each fastened to the aircraft interior component module 12 in the second region 32 of the aircraft interior component module 12. The second structure holders 58 and the second component holders 60 can be formed, for example, by a holder system described in WO 2009/080641 A1. Through the cooperation of the second structure holders 58 with the respective second component holders 60 assigned to them, the aircraft interior component module 12 is fixed to the frames of the aircraft structure such that the mounting gap 40 is closed. The connection of the second structure holders 58 to the respective second component holders 60 assigned to them therefore does not take place, on the mounting of the aircraft interior component module 12 in an aircraft cabin, until the connection of the first connecting device 54 to the second connecting device 56 via the mounting gap 40 has taken place.

Finally, third structure holders 62 are fastened to the frames of the aircraft structure, which holders are intended for cooperating with corresponding third component holders 68 fastened to the aircraft interior component module 12 in a third, central region 64 of the aircraft interior component module 12. The third structure holders 62 secure the aircraft interior component module 12 in its position in the aircraft cabin in cooperation with the respective third component holders 68 assigned to them. The third structure holders 62 and the third component holders 66 can be formed, for example, by a holder system described in WO 2009/080641 A1.

The first structure holders 27 and the first component holders 30, as well as the second structure holders 58 and the second component holders 60 and the third structure holders 62 and the third component holders 68, can be connected to one another without tools.

The invention claimed is:

1. An aircraft interior component system having:
an aircraft interior component,
a first structure holder, which is fastened to an element of an aircraft structure, and
a first component holder, which is fastened to the aircraft interior component and is complementary to the first structure holder, the first component holder being fastened to the aircraft interior component in a first region of the aircraft interior component which faces an aircraft cabin ceiling when the aircraft interior component is mounted in an aircraft, the first structure holder and the first component holder being configured to attach the aircraft interior component in a suspended manner to the element of the aircraft structure, and the aircraft interior component being configured such that, when the aircraft interior component is attached in a suspended manner to the element of the aircraft structure, a mounting gap is present, at least in a second region of the aircraft interior component which faces an aircraft cabin floor when the aircraft interior component is mounted in an aircraft, between a rear side of the aircraft interior component and an aircraft component opposite the rear side of the aircraft interior component,
wherein the aircraft interior component comprises at least one supply line section which is connected to a first connecting device arranged adjacent to the rear side of the aircraft interior component in the second region of the aircraft interior component, the first connecting device being configured to be connected to a second connecting device complementary to the first connecting device, in order to connect the supply line section of the aircraft interior component to a corresponding supply line section of the aircraft, wherein
via the mounting gap, the rear side of the aircraft interior component and the aircraft component opposite the rear side of the aircraft interior component remain accessible even after the aircraft interior component has been attached to the element of the aircraft structure via the first structure holder and the first component holder,
the mounting sap extends from the second region in the direction of the first region of the aircraft interior component,
a portion of the element of the aircraft structure, to which the first structure holder is fastened, and the rear side of the aircraft interior component face each other, and
the mounting gap extends between at least a section of the portion of the element of the aircraft structure facing the rear side of the aircraft interior component and the rear side of the aircraft interior component at least in a second region of the aircraft interior component.

2. The aircraft interior component system according to claim 1, wherein the aircraft interior component is configured such that the mounting gap tapers in the direction of the first region of the aircraft interior component.

3. The aircraft interior component system according to claim 1, wherein the at least one supply line section comprises a plurality of supply line sections which are each connected to the first connecting device arranged in the second region of the aircraft interior component, the first connecting device being configured to cooperate with the second connecting device complementary to the first connecting device, in order to connect the supply line section of the aircraft interior component to corresponding supply line sections of the aircraft.

4. The aircraft interior component system according to claim 1, wherein the first structure holder and the first component holder are configured to attach the aircraft interior component to the element of the aircraft structure so as to be pivotable over a predetermined angular range about a pivot axis, so that through a pivoting of the aircraft interior component about the pivot axis the mounting gap present between the rear side of the aircraft interior component and the aircraft component opposite the rear side of the aircraft interior component can be increased or reduced.

5. The aircraft interior component system according to claim 1, wherein the aircraft interior component system further comprises:
a second structure holder, which is fastened to an element of the aircraft structure, and
a second component holder, which is fastened to the aircraft interior component and is complementary to the second structure holder, the second component holder being fastened to the aircraft interior component in the second region of the aircraft interior component which faces an aircraft cabin floor when the aircraft interior component is mounted in an aircraft, and the second structure holder and the second component holder being configured to attach the aircraft interior component to the element of the aircraft structure in such a manner that the mounting gap between the rear side of the aircraft interior component and the aircraft component opposite the rear side of the aircraft interior component is closed.

6. The aircraft interior component system according to claim 5,
wherein the aircraft interior component system further comprises:
a third structure holder, which is fastened to an element of the aircraft structure, and
a third component holder, which is fastened to the aircraft interior component and is complementary to the third structure holder, the third component holder being fastened to the aircraft interior component in a third region of the aircraft interior component lying between the first and the second region of the aircraft interior component, and the third structure holder and the third component holder being configured to attach the aircraft interior component in its third region to the element of the aircraft structure.

7. The aircraft interior component system according to claim 6, wherein at least one of (i) the first structure holder and the first component holder, (ii) the second structure holder and the second component holder and, (iii) the third structure holder and the third component holder are connectable to one another without tools.

8. A method for mounting an interior component system in an aircraft having the steps:
providing an aircraft interior component,
fastening a first structure holder to an element of the aircraft structure,
fastening a first component holder, complementary to the first structure holder, to the aircraft interior component, the first component holder being fastened to the aircraft interior component in a first region of the aircraft interior component which faces an aircraft cabin ceiling when the aircraft interior component is mounted in an aircraft, and
connecting the first structure holder and the first component holder in such a manner that the aircraft interior component is attached in a suspended manner to the element of the aircraft structure, the aircraft interior component being configured such that, when the aircraft interior component is attached in a suspended manner to the element of the aircraft structure, a mounting gap is present, at least in a second region of the aircraft interior component which faces an aircraft cabin floor when the aircraft interior component is mounted in an aircraft, between a rear side of the aircraft interior component and an aircraft component opposite the rear side of the aircraft interior component,
wherein at least one supply line section of the aircraft interior component, which is connected to a first connecting device arranged adjacent to the rear side of the aircraft interior component in the second region of the aircraft interior component, is connected to a corresponding supply line section of the aircraft, by connecting the first connecting device to a second connecting device complementary to the first connecting device, wherein:
via the mounting gap, the rear side of the aircraft interior component and the aircraft component opposite the rear side of the aircraft interior component remain accessible even after the aircraft interior component has been attached to the element of the aircraft structure via the first structure holder and the first component holder,
the mounting gap extends from the second region in the direction of the first region of the aircraft interior component,
a portion of the element of the aircraft structure, to which the first structure holder is fastened, and the rear side of the aircraft interior component face each other, and
the mounting gap extends between at least a section of the portion of the element of the aircraft structure facing the rear side of the aircraft interior component and the rear side of the aircraft interior component at least in a second region of the aircraft interior component.

9. The method according to claim 8,
wherein the at least one supply line section comprises a plurality of supply line sections, which are each connected to the first connecting device arranged in the second region of the aircraft interior component, and which are connected, by connecting the first connecting device to the second connecting device complementary to the first connecting device, to corresponding supply line sections of the aircraft.

10. The method according to claim 8,
wherein the aircraft interior component is pivoted relative to the element of the aircraft structure over a predetermined angular range about a pivot axis, in order to increase or reduce the mounting gap present between the rear side of the aircraft interior component and the aircraft component opposite the rear side of the aircraft interior component.

11. The method according to claim 8,
further comprising the steps:
fastening a second structure holder to an element of the aircraft structure,
fastening a second component holder, complementary to the second structure holder, to the aircraft interior component, the second component holder being fastened to the aircraft interior component in the second region of the aircraft interior component which faces an aircraft cabin floor when the aircraft interior component is mounted in an aircraft, and
connecting the second structure holder and the second component holder in such a manner that the mounting gap between the rear side of the aircraft interior component and the aircraft component opposite the rear side of the aircraft interior component is closed.

12. The method according to claim 11,
further comprising the steps:
fastening a third structure holder to an element of the aircraft structure,
fastening a third component holder, complementary to the third structure holder, to the aircraft interior component, the third component holder being fastened to the aircraft interior component in a third region of the aircraft interior component lying between the first and the second region of the aircraft interior component, and connecting the third structure holder and the third component holder in such a manner that the aircraft interior component is attached in its third region to the element of the aircraft structure.

13. The method according to claim 12, wherein at least one of (i) the first structure holder and the first component holder, (ii) the second structure holder and the second component holder and (iii) the third structure holder and the third component holder are connected to one another without tools.

* * * * *